United States Patent
Alaei et al.

(10) Patent No.: US 11,384,307 B2
(45) Date of Patent: Jul. 12, 2022

(54) LUBRICANT ADDITIVE AND METHOD FOR PREPARING THE SAME

(71) Applicants: Mahshad Alaei, Tehran (IR); Alimorad Rashidi, Tehran (IR); Mohammad Soleymani, Karaj (IR); Saiedeh Rayatdoost, Tehran (IR)

(72) Inventors: Mahshad Alaei, Tehran (IR); Alimorad Rashidi, Tehran (IR); Mohammad Soleymani, Karaj (IR); Saiedeh Rayatdoost, Tehran (IR)

(*) Notice: Subject to any disclaimer, the term of this patent is extended or adjusted under 35 U.S.C. 154(b) by 0 days.

(21) Appl. No.: 17/205,886

(22) Filed: Mar. 18, 2021

(65) Prior Publication Data
US 2021/0222081 A1 Jul. 22, 2021

Related U.S. Application Data

(60) Provisional application No. 62/993,730, filed on Mar. 24, 2020.

(51) Int. Cl.
| | |
|---|---|
| *C10M 125/22* | (2006.01) |
| *C10M 111/02* | (2006.01) |
| *C10M 101/04* | (2006.01) |
| *C10M 125/26* | (2006.01) |
| *C01B 19/00* | (2006.01) |
| *C01G 39/06* | (2006.01) |
| *C10N 10/04* | (2006.01) |
| *C10N 10/12* | (2006.01) |
| *C10N 70/00* | (2006.01) |
| *C01B 35/12* | (2006.01) |

(52) U.S. Cl.
CPC ......... *C10M 125/22* (2013.01); *C01B 19/007* (2013.01); *C01G 39/06* (2013.01); *C10M 101/04* (2013.01); *C10M 111/02* (2013.01); *C10M 125/26* (2013.01); *C01B 35/126* (2013.01); *C10M 2207/2825* (2013.01); *C10M 2215/1006* (2013.01); *C10N 2010/04* (2013.01); *C10N 2010/12* (2013.01); *C10N 2070/00* (2013.01)

(58) Field of Classification Search
None
See application file for complete search history.

(56) References Cited

FOREIGN PATENT DOCUMENTS

WO WO-2015119716 A1 * 8/2015 ............ C09D 7/62

* cited by examiner

*Primary Examiner* — Daniel S Gatewood
(74) *Attorney, Agent, or Firm* — Bajwa IP Law Firm; Haris Zaheer Bajwa

(57) ABSTRACT

A lubricant additive may be synthesized by forming a nanohybrid of a transition metal dichalcogenide and a metal borate, forming a base oil, and then dispersing the transition metal dichalcogenide into the base oil. An exemplary nanohybrid may be synthesized by forming a first solution by adding a borax solution to an aqueous solution of a metal source, forming a second solution by adding ethanol to the first solution, forming a mixture by mixing the transition metal dichalcogenide with the second solution, and heating the mixture at a temperature of 180° C. to 230° C. and a pressure of 5 to 20 bar under a nitrogen atmosphere.

12 Claims, 2 Drawing Sheets

LUBRICANT ADDITIVE AND METHOD FOR PREPARING THE SAME

CROSS-REFERENCE TO RELATED APPLICATION

This application claims the benefit of priority from U.S. Provisional patent Application Ser. No. 62/993,730, filed on Mar. 24, 2020, and entitled "A NANOADDITIVE FOR IMPROVING PROPERTIES OF DRILLING FLUIDS AND LUBRICATING GREASES," which is incorporated herein by reference in its entirety.

TECHNICAL FIELD

The present disclosure generally relates to lubricant additive compositions and methods for preparing lubricant additive compositions. Particularly, the present disclosure relates to nano additive compositions for drilling fluids and lubricating greases, and methods for preparing the same.

BACKGROUND

Natural gas and oil are present in subterranean formations and to access them, boreholes must be drilled into the earth. Drill bits that may be utilized for drilling oil and natural gas wells need to be protected against wearing out and overheating to prolong their lifespans. Furthermore, drill cuttings must be carried out of boreholes or be suspended when drilling is paused or when the drill bit is brought in and out of the borehole. All of the abovementioned needs may be met by utilizing drilling fluids while drilling natural gas and oil wells and on exploration drilling platforms. In addition, drilling fluids may further provide hydrostatic pressure within a wellbore to prevent formation fluids from entering the wellbore.

A drilling fluid may form a protective layer that may surround and strengthen a drill bit. Such protective layer may reduce the coefficient of friction between drilling equipment and a wellbore. In other words, a drilling fluid may provide lubrication between the drilling equipment and a wellbore during drilling operations. A drilling fluid may be a water-base mud, an oil-based mud, a glycol-based fluid, or an emulsion-based drilling fluid. For example, a water-based mud may include bentonite clay along with additives such as barium sulfate, calcium sulfate, hematite, thickeners, and deflocculants. An oil-based mud may include oil as a base fluid and water as a dispersed phase. Additives such as emulsifiers, wetting agents and gellants may further be used in an oil-based mud composition.

As mentioned in the preceding paragraph, additives may be utilized for establishing or enhancing various properties of drilling fluids, especially their tribological properties. There is an ongoing need to develop better lubricating additives for both water-based and oil-based drilling fluids that may allow for improving lubrication properties of these fluids. There is further a need for developing a lubricant additive that may be utilized for improving tribological properties of gear lubricating greases as well.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a method for preparing a lubricant additive. An exemplary method may include synthesizing a nanohybrid of a transition metal dichalcogenide and a metal borate by forming a first solution by adding a borax solution to an aqueous solution of a metal source. An exemplary metal source may include at least one of an alkali metal halide and an alkaline earth metal halide. Synthesizing an exemplary nanohybrid of an exemplary transition metal dichalcogenide and an exemplary metal borate may further include forming a second solution by adding ethanol to an exemplary first solution, forming a mixture by mixing an exemplary transition metal dichalcogenide with an exemplary second solution, and heating an exemplary mixture at a temperature of 180° C. to 230° C. and a pressure of 5 to 20 bar under a nitrogen atmosphere. An exemplary method may further include dispersing an exemplary synthesized nanohybrid into a base oil.

According to one or more exemplary embodiments, the present disclosure is further directed to a lubricant additive that may include a base oil, and a nanohybrid of a transition metal dichalcogenide and a metal borate. An exemplary nanohybrid may include an exemplary transition metal dichalcogenide chemically bonded to an exemplary metal borate. An exemplary nanohybrid may be dispersed into an exemplary base oil.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

The novel features which are believed to be characteristic of the present disclosure, as to its structure, organization, use and method of operation, together with further objectives and advantages thereof, will be better understood from the following discussion.

The present disclosure is directed to exemplary embodiments of an exemplary lubricant additive composition and methods for preparing an exemplary lubricant additive composition. An exemplary lubricant additive may include a transition metal dichalcogenide/metal borate nanohybrid that may be dispersed into a base lubricant oil to improve the lubricity of the base lubricant oil.

Figure 1A:
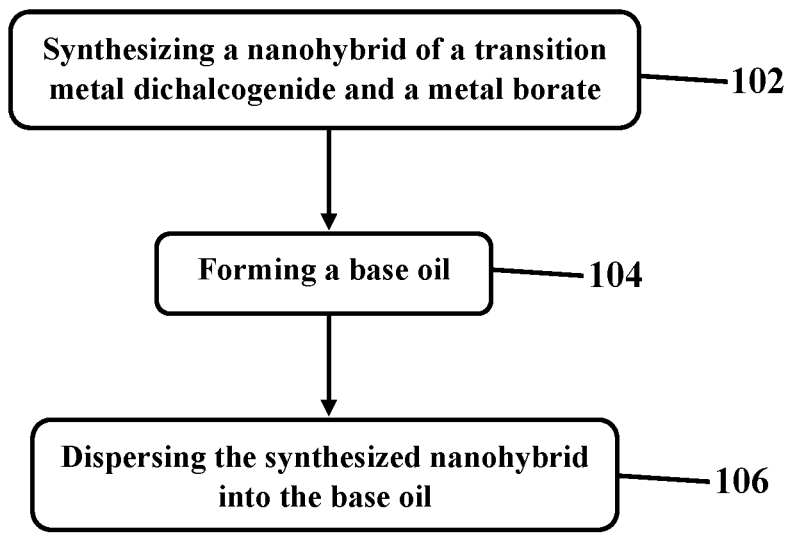
FIG. 1A illustrates a flowchart of a method for preparing a lubricant additive, consistent with one or more exemplary embodiments of the present disclosure.

FIG. 1A illustrates a flowchart of a method 100 for preparing a lubricant additive, consistent with one or more exemplary embodiments of the present disclosure. In an exemplary embodiment, method 100 may include a step 102 of synthesizing a nanohybrid of a transition metal dichalcogenide and a metal borate, a step 104 of forming a base oil, and a step 106 of dispersing the synthesized nanohybrid into the base oil. In an exemplary embodiment, step 102 of synthesizing the nanohybrid of the transition metal dichalcogenide and the metal borate may include a step 108 of forming a first solution by adding a borax solution to an aqueous solution of a metal source, a step 110 of forming a second solution by adding ethanol to the first solution, a step 112 of forming a mixture by mixing the transition metal dichalcogenide with the second solution, and a step 114 of heating the mixture at a temperature of 180° C. to 230° C. and a pressure of 5 bar to 20 bar under a nitrogen atmosphere.

Figure 1B:
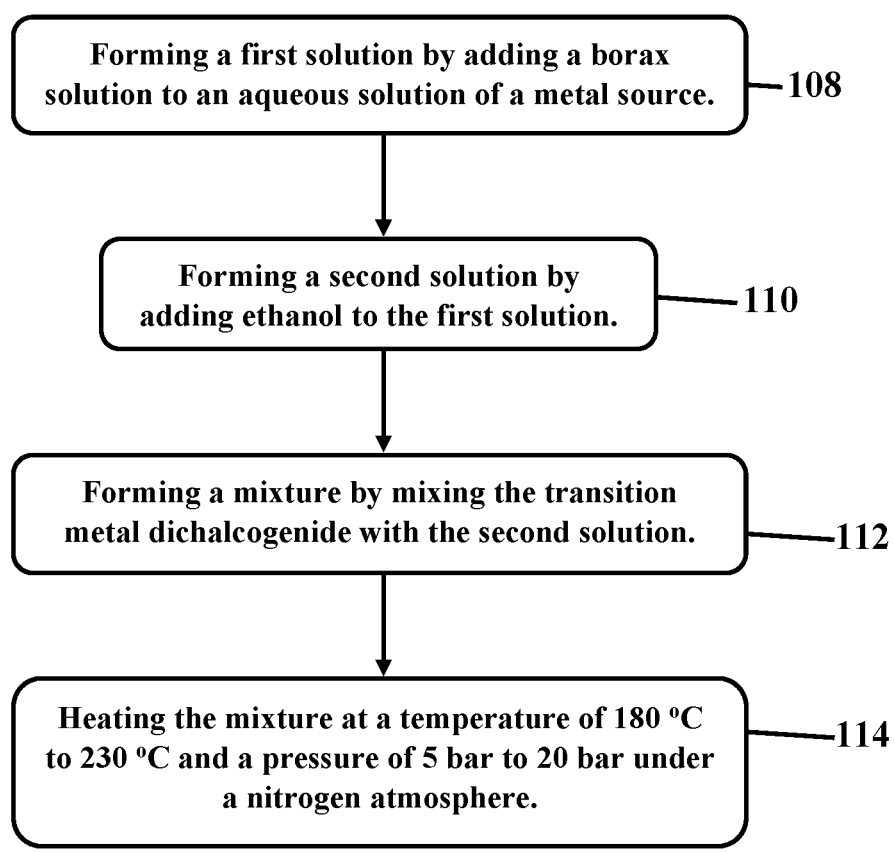
FIG. 1B illustrates a flowchart of a method for synthesizing a nanohybrid of a transition metal dichalcogenide and a metal borate, consistent with one or more exemplary embodiments of the present disclosure.

FIG. 1B illustrates a flowchart of a method for carrying out step 102 of synthesizing the nanohybrid of the transition metal dichalcogenide and the metal borate, consistent with one or more exemplary embodiments of the present disclosure. In an exemplary embodiment, step 102 of synthesizing the nanohybrid of the transition metal dichalcogenide and the metal borate may involve synthesizing a combination of an exemplary transition metal dichalcogenide and an exemplary metal borate through chemical bonding. In other words, as used herein, an exemplary transition metal dichalcogenide/metal borate nanohybrid may refer to an exemplary transition metal dichalcogenide and an exemplary metal borate that are linked together by chemical bonds at a nanometer scale. In an exemplary embodiment, such chemical bonding between an exemplary transition metal dichalcogenide and an exemplary metal borate may be achieved by a synthesis method similar to what is described in steps 108 to 112 below.

In an exemplary embodiment, step 108 of forming the first solution may include adding a borax solution to an aqueous solution of the metal source. In an exemplary embodiment, borax, which is otherwise known as sodium borate, sodium tetra borate, or disodium tetraborate may be dissolved in a solvent, such as ethanol, to obtain a borax solution with a concentration between 0.01 and 0.2 mol/l. In an exemplary embodiment, dissolving borax in a solvent, such as ethanol may include mixing borax and ethanol in a stirred vessel, in which a mechanical stirrer may be utilized for stirring borax and the solvent.

In an exemplary embodiment, the metal source may include at least one of an alkali metal halide and an alkaline earth metal halide. For example, the metal source may be at least one of a magnesium halide, a titanium halide, a zinc halide, and an aluminum halide. In an exemplary embodiment, preparing an aqueous solution of an exemplary metal source may include dissolving the exemplary metal source in distilled water in a mixing mechanism, such as a stirred vessel. In an exemplary embodiment, an exemplary metal source may be dissolved in distilled water to obtain an aqueous solution of the metal source with a concentration between 0.1 and 0.2 g/l.

In an exemplary embodiment, step 108 of forming the first solution may include adding a borax solution to an aqueous solution of the metal source with a molar ratio of borax to the metal source of 1:2 (borax:metal source). In an exemplary embodiment, adding an exemplary borax solution to an exemplary aqueous solution of an exemplary metal source may include dropwise addition of an exemplary borax solution to an exemplary aqueous solution of an exemplary metal source in a stirred vessel, where a mechanical mixer may be utilized for mixing the components.

In an exemplary embodiment, step 110 of forming the second solution may include adding ethanol to the first solution. In an exemplary embodiment, ethanol may be added to and mixed with an exemplary first solution with a volume ratio of 2:1 (ethanol:first solution).

In an exemplary embodiment, step 112 of forming the mixture may include mixing an exemplary transition metal dichalcogenide with the second solution. In an exemplary embodiment, the transition metal dichalcogenide may include at least one of $MoS_2$, $MoSe_2$, $WS_2$, and $WSe_2$. In an exemplary embodiment, mixing an exemplary transition metal dichalcogenide with the second solution may include adding an exemplary transition metal dichalcogenide to the second solution with a concentration of the exemplary transition metal dichalcogenide between 10 g/l and 20 g/l based on the total volume of the second solution. Then, a mechanical mixer may be utilized to stir the mixture for a period of between 10 and 40 minutes. In an exemplary embodiment, an exemplary transition metal dichalcogenide may be in the form of a nano-powder with an average particle size between 20 and 80 nm.

In an exemplary embodiment, step 114 of heating the mixture may include heating the mixture at a temperature of 180° C. to 230° C. and a pressure of 5 to 20 bar under an inert environment, such as nitrogen atmosphere for a period of 12 to 20 hours. In an exemplary embodiment, heating the mixture may lead to a hydrothermal reaction, which in turn may lead to synthesis of an exemplary transition metal dichalcogenide/metal borate nanohybrid. In an exemplary embodiment, the synthesized transition metal dichalcogenide/metal borate nanohybrid may be washed several times with distilled water and may be dried at a temperature between 70 and 90° C. In an exemplary embodiment, the dried transition metal dichalcogenide/metal borate nanohybrid may then be calcinated at a temperature between 400 and 600° C. for a period of 5 to 10 hours. As used herein, calcinating the dried transition metal dichalcogenide/metal borate nanohybrid may refer to heating the transition metal dichalcogenide/metal borate nanohybrid to temperatures between 400 and 600° C. in an air or oxygen atmosphere to remove impurities or volatile substances that may be present in the synthesized transition metal dichalcogenide/metal borate nanohybrid. In an exemplary embodiment, calcinating the dried transition metal dichalcogenide/metal borate nanohybrid may be carried out in a calciner, which is a steel cylinder filled with the dried transition metal dichalcogenide/metal borate nanohybrid that rotates in a heated furnace within a controlled atmosphere. In an exemplary embodiment, after calcination, an exemplary transition metal dichalcogenide/metal borate nanohybrid may be obtained with a weight ratio of [(1-3):(1-3)] [transition metal dichalcogenide:metal borate].

In an exemplary embodiment, step 104 of forming the base oil may include blending a vegetable oil, such as castor oil, cocoa butter, rice bran oil, soybean oil, canola oil, olive oil, palm oil, or mixtures thereof, and optionally an animal fat. In an exemplary embodiment, forming the base oil may include blending a vegetable oil and an animal fat with a total weight ratio of the vegetable oil and the animal fat between 0.3 to 0.6 of the total weight of the lubricant additive. In an exemplary embodiment, blending a vegetable oil and an animal fat may include mechanical blending of an exemplary vegetable oil and an exemplary animal fat in a mechanical blender at a temperature of 50 to 60° C. for 15 to 20 minutes. In an exemplary embodiment, the animal fat may include tallow.

In an exemplary embodiment, step 104 of forming the base oil may further include blending an exemplary vegetable oil and an exemplary animal fat with an ester of an alcohol and a first carboxylic acid and an amide of an amine and a second carboxylic acid. In an exemplary embodiment, blending an exemplary vegetable oil and an exemplary animal fat with an ester of an alcohol and a first carboxylic acid and an amide of an amine and a second carboxylic acid may be carried out in a mechanical blender at 50 to 60° C. for 15 to 20 minutes. In an exemplary embodiment, a total weight ratio of an exemplary ester and an exemplary amide may be between 0.1 and 0.35 of the total weight of the lubricant additive.

In an exemplary embodiment, an exemplary ester of an alcohol and a first carboxylic acid may include a reaction product of the first carboxylic acid and the alcohol. In an exemplary embodiment, an exemplary alcohol may include at least one of a glycol, a branched alkanol, and polyols. In an exemplary embodiment, an exemplary polyol may include a polyol with a branched or unbranched chain of a 1-8 carbon atoms. In an exemplary embodiment, an exemplary first carboxylic acid may include a carboxylic acid with a chain of 10 to 20 carbon atoms. In an exemplary embodiment, an exemplary first carboxylic acid may include at least one of oleic acid and stearic acid. Alternatively, instead of alcohol, an exemplary ether compound with hydroxyl groups may be utilized for reacting with an exemplary first carboxylic acid to form an exemplary ester.

In an exemplary embodiment, an exemplary ester may be a reaction product of an esterification reaction between an exemplary first carboxylic acid and an exemplary alcohol with a weight ration of either 2:1 or 1:1 (first carboxylic acid:alcohol). In an exemplary embodiment, an exemplary ester may be produced via a Fischer esterification, in which an exemplary first carboxylic acid may be treated with an exemplary alcohol in the presence of a dehydrating agent, such as sulfuric acid. In an exemplary embodiment, since Fischer esterification is slow, a catalyst such as sulfuric acid, nitric acid, or hydrochloric acid may be utilized for catalyzing the esterification. In an exemplary embodiment, an exemplary ester of an alcohol and a first carboxylic acid may include a sorbitol ester, such as sorbitan laurate and sorbitan oleate.

In an exemplary embodiment, an exemplary amide of an exemplary amine and an exemplary second carboxylic acid may be a salt obtained from a reaction between an exemplary amine and an exemplary second carboxylic acid. In an exemplary embodiment, an exemplary amine may include at least one of an alkyl amine, such as diethylenetriamine, 1, 4-butanediamine, pentamethylenediamine, spermidine, or spermine, and a propylene polyamine, such as propylene diamine. In an exemplary embodiment, an exemplary first carboxylic acid may include a carboxylic acid with a chain of 10 to 20 carbon atoms. For example, an exemplary second carboxylic acid may include at least one of oleic acid and stearic acid. In an exemplary embodiment, an exemplary amide of an exemplary amine and an exemplary second carboxylic acid with a weight ratio of 2:1 or 1:1 (second carboxylic acid:amine).

In an exemplary embodiment, step 104 of forming the base oil may further include blending an exemplary vegetable oil, an exemplary animal fat, an exemplary ester, and an exemplary amide with a fatty amine. In an exemplary embodiment, blending an exemplary vegetable oil, an exemplary animal fat, an exemplary ester, and an exemplary amide with an exemplary fatty amine may be carried out in a mechanical blender at 50 to 60° C. for 15 to 20 minutes. As used herein, a fatty amine may refer to hydrocarbon chain with amine groups attached to the hydrocarbon chains of 7 to 35 carbon atoms. In an exemplary embodiment, an exemplary fatty amine may include at least one of coco amine, oleyl amine, soya amine, and tallow amine. In an exemplary embodiment, a weight ratio of an exemplary fatty amine is between 0.15 and 0.3 of the total weight of the lubricant additive.

In an exemplary embodiment, step 104 of forming the base oil may further include blending an exemplary vegetable oil, an exemplary animal fat, an exemplary ester, an exemplary amide, and a fatty amine with a metal dialkyl thiosulfate. In an exemplary embodiment, blending an exemplary vegetable oil, an exemplary animal fat, an exemplary ester, an exemplary amide, and a fatty amine with a metal dialkyl thiosulfate may be carried out in a mechanical blender at 50 to 60° C. for 15 to 20 minutes. In an exemplary embodiment, an exemplary metal dialkyl thiosulfate may include at least one of an alkaline earth metal dialkyl thiosulfate and a transition metal dialkyl thiosulfate. For example, an exemplary metal dialkyl thiosulfate may include zinc dialkyl dithiosulfate or magnesium dialkyl dithiosulfate. In an exemplary embodiment, a weight ratio of the metal dialkyl thiosulfate is between 0.02 and 0.15 of the total weight of the lubricant additive.

In an exemplary embodiment, step 106 of dispersing the synthesized nanohybrid into the base oil may include adding an exemplary nanohybrid obtained from step 102 to an exemplary base oil obtained from step 104 with a concentration of the exemplary nanohybrid between 0.005 wt. % and 2 wt. % based on a total weight of the lubricant additive. In an exemplary embodiment, adding an exemplary nanohybrid to an exemplary base oil may include blending the exemplary nanohybrid with the exemplary base oil in a mechanical blender at a temperature between 70° C. and 80° C. In an exemplary embodiment, step 106 of dispersing the synthesized nanohybrid into the base oil may further include utilizing a sonicator for further homogenizing the blend of an exemplary nanohybrid and an exemplary base oil.

According to one or more exemplary embodiments, the present disclosure is further directed to a lubricant additive that may be synthesized by a method similar to method 100. In an exemplary embodiment, an exemplary lubricant additive may include a base oil and a nanohybrid of a transition metal dichalcogenide and a metal borate, where an exemplary nanohybrid may be dispersed into an exemplary base oil. In an exemplary embodiment, an exemplary nanohybrid may include a transition metal dichalcogenide/metal borate nanohybrid with a weight ratio of [(1-3):(1-3)] [transition metal dichalcogenide:metal borate]. In an exemplary embodiment, an exemplary transition metal dichalcogenide may include at least one of $MoS_2$, $MoSe_2$, $WS_2$, and $WSe_2$. In an exemplary embodiment, an exemplary metal borate may include at least one of an alkaline earth metal borate and a transition metal borate. In an exemplary embodiment, an exemplary lubricant additive may include between 0.005 wt. % and 2 wt. % of an exemplary transition metal dichalcogenide/metal borate nanohybrid, based on a total weight of the lubricant additive.

In an exemplary embodiment, an exemplary lubricant additive may include 10 to 35 wt. % of a blend of a fatty acid ester and a fatty acid polyamine salt, 20 to 50 wt. % of a blend of a vegetable oil and an animal fat, 15 to 30 wt. % of a fatty amine, 2 to 15 wt. % of a metal dialkyl thiosulfate, and 0.005 wt. % and 2 wt. % of an exemplary transition metal dichalcogenide/metal borate nanohybrid.

EXAMPLES

Example 1: Forming a Base Oil

In this example, an exemplary base oil was synthesized and effects of the synthesized exemplary base oil on improving the lubricity and extreme pressure properties of a water-based drilling mud were examined. The exemplary base oil was prepared by a method similar to step 104 of method 100. The exemplary base oil included a fatty acid salt of diethylenetriamine (DETA), a fatty acid ester, castor oil, tallow amine, and zinc dialkyl thiosulfate.

The fatty acid ester utilized in this example included fatty acid ester of 2-pentanol and oleic acid formed in the presence of xylene or toluene as the reaction solvent. Sulfuric acid as a catalyst was utilized for promoting the esterification reaction. Here, 2-pentanol, oleic acid, and concentrated sulfuric acid may be added to a flask. Then, the flask may be gently heated directly or indirectly over a heat source, such as a Benson burner or a hot plate. Indirect heating may refer to placing the flask in a sand bath and then heating the sand bath so that heat is transferred to the flask evenly through the sand bath. The heated reaction flask may be equipped with a cooled condenser tube and together they may form a reflux that may allow for heating the reaction mixture to speed up the esterification reaction without losing any reactants or products to evaporation. To separate the formed ester from the reaction mixture after the esterification reaction is done, aqueous solution of sodium carbonate may be added to the flask, which may lead to separation of an ester phase and an aqueous phase, which may then be separated from each other utilizing a separating funnel.

The fatty acid salt of DETA included a fatty acid amide of DETA and oleic acid obtained in the presence of xylene or toluene as the reaction solvent. For example, a solution of oleic acid in xylene may be added dropwise to a solution of DETA in xylene under reflux. The mixture may be refluxed for 4 hours.

In this example, three base oils with three different compositions were synthesized to investigate the effects of different base oil compositions on the lubricity of a base drilling mud. Table 1 summarizes the composition of the exemplary drilling mud that was utilized in this example and Table 2 summarizes the compositions of the three exemplary base oils that were prepared in this example. Here, 3 g of each base oil sample was dispersed into the exemplary drilling mud.

TABLE 1

Base Drilling Mud Composition

| Chemical Compound | Amount |
|---|---|
| water | 340 ml |
| bentonite | 21.5 g |
| lime | 1 g |
| NaHCO$_3$ | 1 g |
| starch | 0.9 g |

TABLE 2

Base Oil Compositions (wt. %)

| | Samples | | |
| Compounds | Base Oil 1 | Base Oil 2 | Base Oil 3 |
|---|---|---|---|
| Ester of 2-Pentanol and Oleic Acid | 11 | 50 | 30 |
| Fatty Acid Amide of DETA and Oleic Acid | 11 | 50 | 50 |
| Castor Oil | 43 | 0 | 20 |
| Tallow Amine | 25 | 0 | 20 |
| Zinc dialkyl thiosulfate | 10 | 0 | 0 |

Lubricating properties of the base drilling mud in the presence of the three base oil samples and a commercially available lubricant additive was evaluated by a device for evaluating the tribological properties of drilling fluids.

Table 3 summarizes the test results of the lubricity evaluation of the prepared samples. Tested samples included a base mud without any additives, the base mud with the commercially available additive, the base mud, and the base oil 1, the base mud and the base oil 2, and the base mud and the base oil 3. As is evident from the results reported in Table 3, the lubricity of the synthesized base oil samples is comparable with that of the commercially available lubricant.

TABLE 3

Lubricity Test Results

| Sample | Torque | Coefficient of Friction |
|---|---|---|
| Base mud | 52 | 0.4592 |
| Base mud + Bit-lub | 5 | 0.0400 |
| Base mud + base oil 1 | 5.5 | 0.0429 |
| Base mud + base oil 2 | 14 | 0.1160 |
| Base mud + base oil 3 | 13 | 0.1016 |

Example 2: Synthesizing WS$_2$ Nanoparticles

In this example, WS$_2$ nanoparticles were synthesized. (120-150) ml of a solution of ammonium para tungstate and citric acid was prepared, which contained (4-6) g of ammonium para tungstate and (0.5-2) g of citric acid. pH of the prepared solution was adjusted to 7 by adding an ammonium hydroxide solution to the prepared solution. After adjusting the pH, the prepared solution was heated at 100° C. to evaporate the water content of the prepared solution and thereby reducing a volume of the prepared solution to 50 ml. After preparing the solution with the reduced volume, the prepared solution was heated at a temperature of 250° C. for 1 hour and then it was calcinated at 500° C. for 2 hours to obtain a yellow WO$_3$ nano powder. An average diameter of the synthesized WO$_3$ nanoparticles was 50 nm. In this example, the synthesized WO$_3$ nanoparticles were reacted with H$_2$S gas under inert reducing atmosphere of N$_2$/H$_2$ at 900° C. within a tube furnace to produce WS$_2$ nanoparticles with an average diameter of 70 nm.

Example 3: Synthesizing MoS$_2$ Nanoparticles

In this example, MoS$_2$ nanoparticles were synthesized. (120-150) ml of a solution of ammonium paramolybdate and citric acid was prepared, which contained (4-6) g of ammonium paramolybdate and (0.5-2) g of citric acid. pH of the prepared solution was adjusted to 7 by adding an ammonium hydroxide solution to the prepared solution. After adjusting the pH, the prepared solution was heated at 100° C. to evaporate the water content of the prepared solution and thereby reducing a volume of the prepared solution to 50 ml. After evaporating the water content, the prepared solution was heated at a temperature of 250° C. for 1 hour and then it was calcinated at 500° C. for 2 hours to obtain a yellow $MoO_3$ nano powder. An average diameter of the synthesized $MoO_3$ nanoparticles was 50 nm. In this example, the synthesized $MoO_3$ nanoparticles were reacted with $H_2S$ gas under inert reducing atmosphere of $N_2/H_2$ at 900° C. within a tube furnace to produce $MoS_2$ nanoparticles with an average diameter of 70 nm.

Example 4: Synthesizing Magnesium Borate Nanoparticles

In this example, magnesium borate nanoparticles are synthesized. To this end, a first solution was prepared by adding a borax solution to an aqueous solution of $MgCl_2 \cdot 6H_2O$ with a molar ratio of borax to $MgCl_2 \cdot 6H_2O$ equal to 1:2. Borax solution was prepared by dissolving borax in ethanol and the aqueous solution of $MgCl_2 \cdot 6H_2O$ was prepared by dissolving $MgCl_2 \cdot 6H_2O$ in water. Here, a second solution was formed by adding 400 ml of ethanol to the mixture of the borax solution and the aqueous solution of $MgCl_2.6H_2O$. The second solution was then transferred to an autoclave, where a hydrothermal reaction was carried out by heating the second solution at 15 bar and 200° C. for 18 hours. The magnesium borate nanohybrid was synthesized via the aforementioned hydrothermal reaction and after that the synthesized magnesium borate nanoparticles were washed several times with distilled water and were dried at 80° C. The dried magnesium borate nanoparticles were then calcinated at 500° C. for 6 hours.

Example 5: Synthesizing $WS_2$/Magnesium Borate Nanohybrid

In this example, $WS_2$/magnesium borate nanohybrid is synthesized by a method similar to step 102 of method 100. To this end, a first solution was prepared by adding a borax solution to an aqueous solution of $MgCl_2 \cdot 6H_2O$ with a molar ratio of borax to $MgCl_2 \cdot 6H_2O$ equal to 1:2 Borax solution was prepared by dissolving borax in ethanol and the aqueous solution of $MgCl_2 \cdot 6H_2O$ was prepared by dissolving $MgCl_2 \cdot 6H_2O$ in water. Here, a second solution was formed by adding 400 ml of ethanol to the mixture of the borax solution and the aqueous solution of $MgCl_2.6H_2O$. After that, the prepared $WS_2$ nanoparticles that were synthesized as described in Example 2 above were added to the obtained second solution to obtain a mixture. The mixture was stirred for 30 minutes. The mixture was then transferred to an autoclave, where a hydrothermal reaction was carried out by heating the mixture at 15 bar and 200° C. for 18 hours. The $WS_2$/magnesium borate nanohybrid was synthesized via the aforementioned hydrothermal reaction and after that the synthesized $WS_2$/magnesium borate nanohybrid was washed several times with distilled water and was dried at 80° C. The dried $WS_2$/magnesium borate nanohybrid was then calcinated at 500° C. for 6 hours.

Example 6: Synthesizing $MoS_2$/Magnesium Borate Nanohybrid

In this example, $MoS_2$/magnesium borate nanohybrid is synthesized by a method similar to step 102 of method 100. To this end, a first solution was prepared by adding a borax solution to an aqueous solution of $MgCl_2 \cdot 6H_2O$ with a molar ratio of borax to $MgCl_2 \cdot 6H_2O$ equal to 1:2. Borax solution was prepared by dissolving borax in ethanol and the aqueous solution of $MgCl_2 \cdot 6H_2O$ was prepared by dissolving $MgCl_2 \cdot 6H_2O$ in water. Here, a second solution was formed by adding 400 ml of ethanol to the mixture of the borax solution and the aqueous solution of $MgCl_2 \cdot 6H_2O$. After forming the second solution, the prepared $MoS_2$ nanoparticles that were synthesized as described in Example 2 above were added to the obtained second solution to obtain a mixture. The mixture was stirred for 30 minutes. The mixture was then transferred to an autoclave, where a hydrothermal reaction was carried out by heating the mixture at 15 bar and 200° C. for 18 hours. The $MoS_2$/magnesium borate nanohybrid was synthesized via the aforementioned hydrothermal reaction and after that the synthesized $WS_2$/magnesium borate nanohybrid was washed several times with distilled water and was dried at 80° C. The dried $MoS_2$/magnesium borate nanohybrid was then calcinated at 500° C. for 6 hours.

Example 7: Preparing a Lubricant Additive and Utilizing the Lubricant Additive for a Water-Based Drilling Mud In this example, a lubricant additive was prepared by dispersing the synthesized $WS_2$/magnesium borate nanohybrid into the base oil 1 sample that was synthesized in Example 1. To this end, $WS_2$/magnesium borate nanohybrid was blended with the base oil 1 with a concentration of 3 wt. % based on a total weight of the blend. Blending the $WS_2$/magnesium borate nanohybrid and the base oil 1 was carried out at a temperature between 60° C. and 80° C. for 5 minutes. For comparison, another lubricant additive was prepared by dispersing the synthesized $MoS_2$/magnesium borate nanohybrid into the base oil 1 sample that was synthesized in Example 1. To this end, $MoS_2$/magnesium borate nanohybrid was blended with the base oil 1 with a concentration of 3 wt. % based on a total weight of the blend. Blending the $MoS_2$/magnesium borate nanohybrid and the base oil 1 was carried out at a temperature between 60° C. and 80° C. for 5 minutes.

Other additives, such as commercially available Bit lub additive, $WS_2$ nanoparticles, magnesium borate nanoparticles, graphene oxide nanostructure, CuS nanoparticles, spherical silica nanoparticles, fumed silica nanoparticles, functionalized multi-walled carbon nanotubes, functionalized graphene nanostructure, functionalized activated carbon nanostructures, and $TiO_2$ nanoparticles, were also added to the base oil 1 to synthesize different additives for the base drilling mud of Table 1.

Extreme pressure and lubricating properties of all the prepared samples were evaluated. Lubricity evaluation results are reported in Tables 4 and 5 below. As evident in Table 5, the film strength of a sample containing nanohybrid tungsten disulfide and magnesium borate is about seven times higher than a sample containing a commercial lubricant (Bit-lub).

TABLE 4

Lubricity Test Results

| Sample | Torque | Coefficient of friction |
|---|---|---|
| Base mud | 52 | 0.4592 |
| Base mud + Bit-lub | 5 | 0.0400 |
| Base mud + WS$_2$ nanoparticles + base oil 1 | 9 | 0.0850 |
| Base mud + magnesium borate nanoparticles + base oil 1 | 11 | 0.0935 |
| Base mud + WS$_2$/magnesium borate nanohybrid + base oil 1 | 4 | 0.0377 |
| Base mud + MoS$_2$/magnesium borate nanohybrid + base oil 1 | 4.5 | 0.0437 |
| Base mud + graphene oxide nanostructure + base oil 1 | 7 | 0.0540 |
| Base mud + CuS nanoparticles + base oil 1 | 5.5 | 0.0512 |
| Base mud + spherical silica nanoparticles + base oil 1 | 9 | 0.0703 |
| Base mud + fumed silica nanoparticles + base oil 1 | 6 | 0.0485 |
| Base mud + functionalized Multi Walled Carbon nanotubes + base oil 1 | 14 | 0.1133 |
| Base mud + functionalized graphene nanostructure + base oil 1 | 15 | 0.1214 |
| Base mud + functionalized active carbon nanostructure + base oil 1 | 14 | 0.1106 |
| Base mud + TiO$_2$ nanoparticles + base oil 1 | 14 | 0.1220 |

TABLE 5

Extreme Pressure Test Results

| Sample | Scar width [hundredth of In.] | Film Strength [psi] |
|---|---|---|
| Base mud | 20.6 | 3881 |
| Base mud + Bit-lub | 35.51 | 4397 |
| Base mud + WS$_2$ nanoparticles + base oil 1 | 16.40 | 19500 |
| Base mud + magnesium borate nanoparticles + base oil 1 | 18.60 | 24358 |
| Base mud + WS$_2$/magnesium borate nanohybrid + base oil 1 | 14.65 | 30924 |
| Base mud + MoS$_2$/magnesium borate nanohybrid + base oil 1 | 15.42 | 29323 |
| Base mud + graphene oxide nanostructure + base oil 1 | 19.8 | 15882 |
| Base mud + CuS nanoparticles + base oil 1 | 23.1 | 18920 |
| Base mud + spherical silica nanoparticles + base oil 1 | 29.30 | 7094 |
| Base mud + fumed silica nanoparticles + base oil 1 | 24.30 | 15792 |
| Base mud + functionalized Multi Walled Carbon nanotubes + base oil 1 | 17.15 | 17714 |
| Base mud + functionalized graphene nanostructure + base oil 1 | 16.90 | 14823 |
| Base mud + functionalized active carbon nanostructure + base oil 1 | 16.55 | 19645 |
| Base mud + TiO$_2$ nanoparticles + base oil 1 | 27.6 | 5600 |

Example 8: Utilizing the Lubricant Additive for a Gear Lubricating Grease

In this example, similar lubricant additives that were used in Example 7 for a water-based drilling mud were used for a gear lubricating grease. Other additives, such as commercially available Bit-lub additive, WS$_2$ nanoparticles, and magnesium borate nanoparticles were also added to the base oil 1 to synthesize different additives for the gear lubricating grease. In this example, the gear lubricating grease was a lithium-based grease. Here, the lubricant additives were mixed with the lithium-based grease with a concentration of 5 wt. % based on the total weight of the mixture.

Extreme pressure and lubricating properties of all the prepared samples were evaluated by a four-ball test machine. Lubricity evaluation results are reported in Table 6 below. A higher weld point value may be indicative of a higher extreme pressure property of a sample. As is evident from Table 6, for the samples with the same weld point, increasing the width of wear scar is equivalent to reducing the anti-wear property of the desired sample. For example, the weld point of a grease sample that contains a commercial lubricant (Bit-lub) is less than a grease sample containing an exemplary nano-hybrid tungsten disulfide and magnesium borate, and therefore, the extreme pressure property of a grease sample with the commercial lubricant is lower than that of a grease sample with an exemplary nano-hybrid tungsten disulfide and magnesium borate.

TABLE 6

Extreme Pressure Test Results

| Sample | Weld point (kgf) | Pass point (kgf) | Width of wear scar (mm) |
|---|---|---|---|
| Lithium grease | 126 | 100 | — |
| Lithium grease + Bit-lub | 250 | 200 | 1.274 |
| Lithium grease + WS$_2$ nanoparticles + base oil 1 | 250 | 200 | 2.277 |
| Lithium grease + magnesium borate nanoparticles + base oil 1 | 315 | 250 | 2.1914 |
| Lithium grease + WS$_2$/magnesium borate nanohybrid + base oil 1 | 315 | 250 | 3.177 |
| Lithium grease + MoS$_2$/magnesium borate nanohybrid + base oil 1 | 200 | — | |

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps. Moreover, the word "substantially" when used with an adjective or adverb is intended to enhance the scope of the particular characteristic, e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A method for preparing a lubricant additive, the method comprising:
    synthesizing a nanohybrid of a transition metal dichalcogenide and a metal borate by:
        forming a first solution by adding a borax solution to an aqueous solution of a metal source, the metal source comprising at least one of an alkali metal halide and an alkaline earth metal halide;
        forming a second solution by adding ethanol to the first solution;
        forming a mixture by mixing the transition metal dichalcogenide with the second solution; and
        heating the mixture at a temperature of 180° C. to 230° C. and a pressure of 5 to 20 bar under a nitrogen atmosphere; and
    dispersing the synthesized nanohybrid into a base oil.

2. The method of claim 1, wherein forming the first solution comprises adding the borax solution to the aqueous solution of the metal source with a molar ratio of 1:2 (borax:metal source).

3. The method of claim 2, wherein mixing the transition metal dichalcogenide with the second solution comprises mixing at least one of $MoS_2$, $MoSe_2$, $WS_2$, and $WSe_2$ with the second solution.

4. The method of claim 2, wherein mixing the transition metal dichalcogenide with the second solution, comprises mixing transition metal dichalcogenide nano-powders with average particle sizes between 20 nm and 80 nm with the second solution.

5. The method of claim 4, wherein forming the mixture comprises forming a mixture of 10 g to 20 g of the transition metal dichalcogenide per liter of the second solution.

6. The method of claim 5, wherein adding the borax solution to the aqueous solution of the metal source comprising adding the borax solution to the aqueous solution of at least one of a magnesium halide, a titanium halide, a zinc halide, and an aluminum halide.

7. The method of claim 6, wherein dispersing the synthesized nanohybrid into the base oil comprises adding the synthesized nanohybrid to the base oil with a concentration of the synthesized nanohybrid between 0.005 wt. % and 2 wt. % based on a total weight of the lubricant additive.

8. The method of claim 6, wherein dispersing the synthesized nanohybrid into the base oil comprises adding the synthesized nanohybrid to the base oil, the synthesized nanohybrid comprising the transition metal dichalcogenide and the metal borate with a weight ratio of X:Y (transition metal dichalcogenide:metal borate), wherein X is in a range of 1 to 3 and Y is in a range of 1 to 3.

9. The method of claim 7, further comprising forming the base oil by blending:
    a vegetable oil comprising at least one of castor oil, cocoa butter, rice bran oil, soybean oil, canola oil, olive oil, and palm oil; and
    an animal fat,
    wherein a total weight ratio of the vegetable oil and the animal fat amounts to 0.3 to 0.6 of the total weight of the lubricant additive.

10. The method of claim 9, wherein forming the base oil further comprises blending the vegetable oil and the animal fat with:
    an ester of an alcohol and a first carboxylic acid, the alcohol comprising at least one of a glycol, a branched alkanol, and polyols, the first carboxylic acid comprising at least one of oleic acid and stearic acid; and
    an amide of an amine and a second carboxylic acid, the amine comprising at least one of an alkyl amine and a propylene polyamine, the second carboxylic acid comprising at least one of oleic acid and stearic acid,
    wherein a total weight ratio of the ester and the amide amounts to 0.1 to 0.35 of the total weight of the lubricant additive.

11. The method of claim 10, wherein forming the base oil further comprises blending the vegetable oil, the animal fat, the ester, and the amide with a fatty amine, the fatty amine comprising at least one of coco amine, oleyl amine, soya amine, and tallow amine, wherein a weight ratio of the fatty amine is between 0.15 and 0.3 of the total weight of the lubricant additive.

12. The method of claim 11, wherein forming the base oil further comprises blending the vegetable oil, the animal fat, the ester, the amide, and the fatty amine with a metal dialkyl thiosulfate, the metal dialkyl thiosulfate comprising at least one of an alkaline earth metal dialkyl thiosulfate and a transition metal dialkyl thiosulfate, wherein a weight ratio of the metal dialkyl thiosulfate is between 0.02 and 0.15 of the total weight of the lubricant additive.

* * * * *